(12) United States Patent
Bittles et al.

(10) Patent No.: US 8,539,508 B2
(45) Date of Patent: Sep. 17, 2013

(54) MESSAGE ORDERING USING DYNAMICALLY UPDATED SELECTORS

(75) Inventors: William Bittles, Hursley Park (GB);
Simon Gormley, Hursley Park (GB);
Chris Matthewson, Hursley Park (GB);
Paul Titheridge, Hursley Park (GB)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 12/608,708

(22) Filed: Oct. 29, 2009

(65) Prior Publication Data
US 2011/0107350 A1 May 5, 2011

(51) Int. Cl.
*G06F 13/00* (2006.01)
(52) U.S. Cl.
USPC ........................................................ 719/314
(58) Field of Classification Search
None
See application file for complete search history.

(56) References Cited

U.S. PATENT DOCUMENTS 6,563,836 B1      5/2003  Capps et al.
6,658,485 B1 *  12/2003  Baber et al. ................... 719/314

OTHER PUBLICATIONS

David Currie; Grouping messages using the WebSphere MQ Java and JMS APIs; 9 pages; Feb. 15, 2006; http://www.ibm.com/developerworks/websphere/library/techarticles/0602_currie/0602_currie.html.*
Chuck Cavaness, Brian Keeton; The Components of Java Message Service; Apr. 5, 2002; 37 pages.*

* cited by examiner

*Primary Examiner* — H S Sough
*Assistant Examiner* — Kimberly Jordan
(74) *Attorney, Agent, or Firm* — Scully, Scott, Murphy & Presser, P.C.; Jeanine Ray

(57) ABSTRACT

A method of queuing messages for communications between a first computer program and a second computer program, comprises: placing a plurality of messages in a queue, wherein each message has a message body; placing selector information on each message, wherein the selector information contains information as to which message is to be processed next; and using the selector information on a message to identify a next message for processing.

20 Claims, 3 Drawing Sheets

MESSAGE ORDERING USING DYNAMICALLY UPDATED SELECTORS

BACKGROUND OF THE INVENTION

1. Field of the Invention

The present invention generally relates to computer systems, and more specifically to a method and system of dynamic priority retrieval from a queue.

2. Description of Related Art

Message queuing provides reliable transfer of information between computer applications, regardless of the type of computer or network. Some commercial queuing packages, such as IBM's MQSeries, offer a high-level application program interface (API) which shields programs from the complexities of different operating systems and underlying networks.

A message is mainly a string of bits and bytes (data representing items such as account numbers, account balances, booking requests, names and addresses, images of documents, etc.) that one program wants to send to another. This type of data is often called application data. Of course, a message needs to include other information, such as its destination and possibly a return address. This type of data is called the message descriptor. A program sending a message defines the application data and supplies it. Such data can include character strings, bit strings, binary integers, packed-decimal integers, floating-point numbers, etc.

A message queue is an area of storage set aside (by a "queue manager") to hold messages on their way from one program to another. In the prior art approach to message queuing, the sending queue and receiving queue are typically implemented as First-In, First-Out (FIFO) queues. With a FIFO implementation, messages are queued for transmission (and subsequently transmitted) in the order in which they are sent to the queuing system by the sending application. On the receiving side, the messages are stored in the queuing system in the order in which they are received from the network. When messages of varying priorities are sent and received, separate FIFO queues may be used for each different priority, with messages waiting in higher-priority queues being serviced before those in lower-priority queues. Or, a single queue may be used which mixes messages of different priority together, where a technique such as using separate head-of-queue pointers and linked lists for each priority enables finding higher-priority messages first—with the result that the queue is not processed in a strictly FIFO manner.

Thus, by default, a message queue works like a physical queue: first in is first out (FIFO). When using a queuing package, however, it is sometimes desirable to pull items out of the queue in priority. Unfortunately, most message queuing packages only allow the priority of a message to be set at the moment a message is placed on a queue. It is then impossible to change the priority of a message, and thus the order the messages will be retrieved. No techniques are known to the inventors which enable dynamically changing the priority of a message once it has been queued for transmission, and/or once message transmission has begun.

Some queuing packages allow the setting of a "key" in a message. A receiving process (program) specifies a particular key on its call to get a message from a queue, and only messages with that same key will be returned. This approach may incidentally allow prioritization of messages, but only if the receiving process assigns a high priority to a particular key. If there are no messages with that key, it then looks for its second most important key, etc. However, most queuing software requires that the key in the message and the key in the get call match exactly. This approach eliminates being able to search for categories of keys. Also, the number of keys that a single message can have is very limited, usually only one or two, restricting the manner in which properties of a message can be stored in the keys of a message. It would, therefore, be desirable to devise a method of pulling messages out of a queue with dynamic priority, and the queuing system return those messages in that priority.

SUMMARY OF THE INVENTION

In an embodiment there is disclosed a method of queuing messages for communications between a first computer program and a second computer program, comprising the steps of:

placing a plurality of messages in a queue, wherein each message has a message body;

placing selector information on each message, wherein said selector information contains information as to which message is to be processed next; and using said selector information on a message to identify a next message for processing, wherein a processor device executing one or more of said placing a plurality of messages, said placing selector information and said using.

In another embodiment there is disclosed a computer program product for use with a computer, the computer program producer including a computer readable medium having recorded thereon a computer program or program code for causing the computer to perform a method for storing and retrieving data, the method comprising:

placing a plurality of messages in a queue, wherein each message has a message body;

placing selector information on each message, wherein said selector information contains information as to which message is to be processed next; and using said selector information on a message to identify a next message for processing.

In another embodiment there is disclosed a system of queuing messages for communications between a first computer program and a second computer program, the system comprising:

means for placing a plurality of messages in a queue, wherein each message has a message body;

means for placing selector information on each message, wherein said selector information contains information as to which message is to be processed next; and means for using said selector information on a message to identify a next message for processing.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE INVENTION

Figure 1:
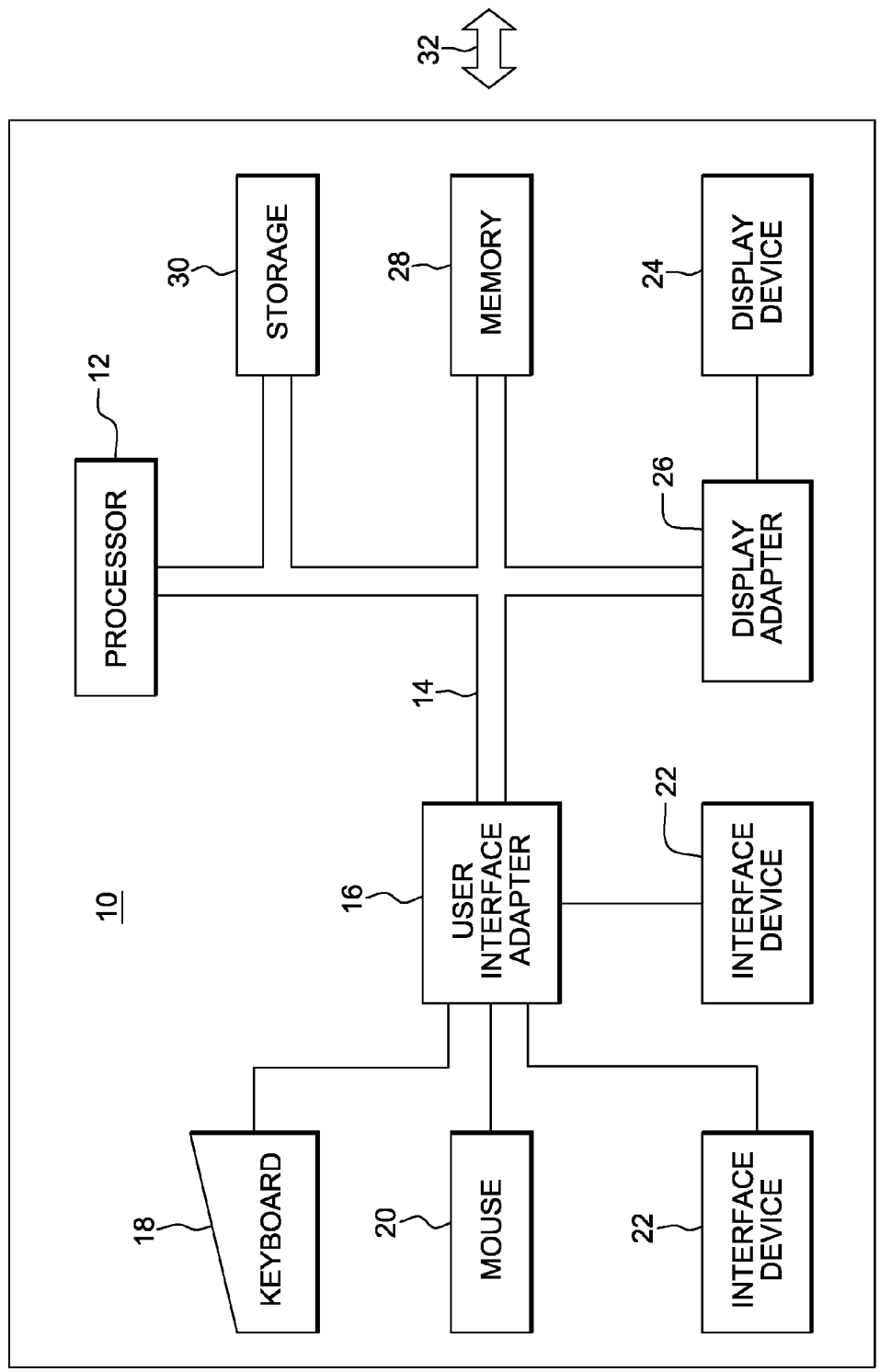
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example, via a communications channel or modem 32. Alternatively, the workstation 10 may communicate using a wireless interface at 32, such as a CDPD (cellular digital packet data) card. The workstation 10 may be associated with such other computers in a LAN or a wide area network (WAN), or the workstation 10 can be a client in a client/server arrangement with another computer, etc. All of these configurations, as well as the appropriate communications hardware and software, are known in the art.

Figure 2:
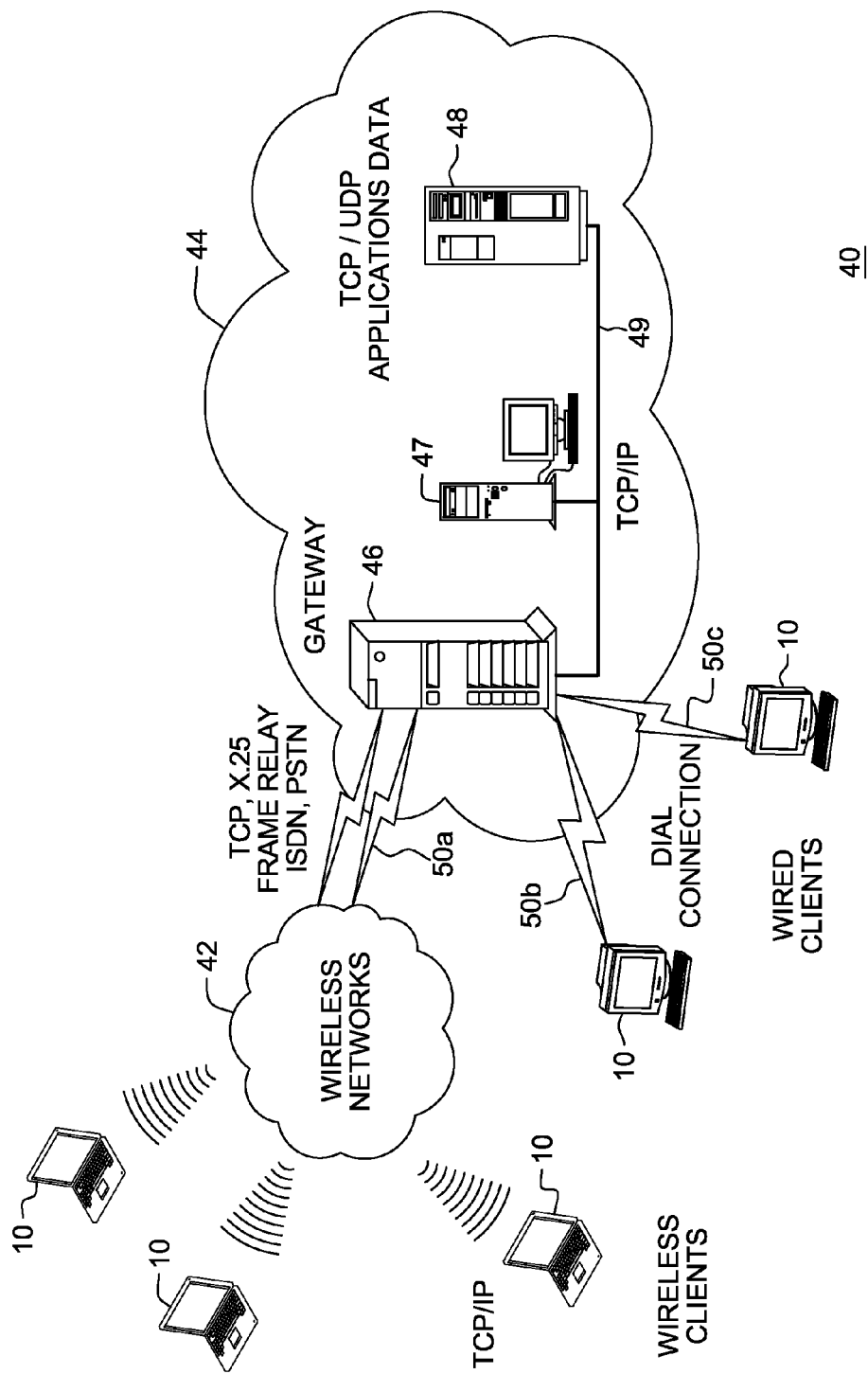
FIG. 2 is a diagram of a networked computing environment is which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, one or more LANs may be included (not shown), where a LAN may comprise a plurality of intelligent workstations coupled to a host processor. The networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, or an Enterprise Systems Architecture/390 computer, etc. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The gateway computer 46 may also be coupled 49 to a storage device (such as data repository 48). Further, the gateway 46 may be directly or indirectly coupled to one or more workstations 10.

Workstations 10 may connect to the wireless network 42 using the Transmission Control Protocol/Internet Protocol ("TCP/IP") over a number of alternative connection media, such as a cellular phone, radio frequency networks, satellite networks, etc. Wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 and server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known to those familiar with the art.

In an embodiment, the present invention is implemented as a computer software program. This program will be used where message queuing is being used to send messages from a sending application on one computer to a receiving application on a different computer, where the queued messages will be sent over a network connection. Using the present invention, the priority of queued messages can be changed by the sending application (including input from their human users). In the preferred embodiment, the implementation of the logic for changing the priority is selector information in each queue message that is read by a message selector in the different computer and which are invoked during execution of the message queuing process. Alternatively, the logic may be implemented as a separate utility program, which provides services that are accessed by the message queuing process, without deviating from the inventive concepts disclosed herein. Logic supporting creation of the change-priority requests is invoked by the application programs. The implementation of the priority-change logic may execute on a client computer, on a server, or both. The server may be in a corporate intranet or extranet of which the client's workstation is a component. Use of the term "Internet" herein, when discussing processing associated with the user's request, includes processing that occurs in an intranet or extranet, unless otherwise stated. The present invention operates independently of the communications protocol used to send messages between the client and server.

The preferred embodiment of the present invention assumes the availability of a queuing system at both the sending and receiving sides of the network connection, and that selector information located in the message is associated with each message that is queued to be sent. It also assumes that large data objects, such as files, may be partitioned into multiple message segments (to be sent as multiple messages), which share the same priority.

The present invention is directed to a messaging and queuing system that provides a convenient and reliable method of transmitting information between computer applications/programs, including programs that reside in different environments, e.g., programs running on different operating systems in different computers (clients or servers) that are interconnected by a network. The novel messaging and queuing system provides dynamic prioritization and handling of messages, by adding "selector information" to each message before it is sent. Selector information is an arbitrary function such as a message which is placed in the message being sent and is read by a message selector. The selector information tells the message selector which message should be processed next.

Once a message has been sent by the sending computer, the selector information cannot be changed. The selector information that is read in a message identifies the next message. A consumer then selects as a next message the message that matches that ID. Thus, the next message that it reads matches the selector information. The text of the next selector information can be similar to or different than the previous read selector information. The sending computer can change the selector information in the next message to include completely different, non-predefined selector information. By including selector information to each message, the sending computer can specify a dynamic, arbitrary order to the messages in the queue. The selector information can be a message that is a part of the contents of a message or a stand alone message. A message selector uses the selector information to change the order of the messages in a queue after the messages are sent. Thus, messages can arrive out of physical order at a queue and still be processed in their intended order. In an embodiment where multiple message producers are used which place messages into the same queue where the messages arrive interleaved, the messages are processed in the order that they were sent, not in the order that they arrived.

In an application of the invention, there may be a need to process messages from multiple applications in a particular order, e.g., round robin. In this embodiment, selector information is added to each message where the selector information in a preceding message points a message selector to select a subsequent message as a next occurring message. The message selector is unaware of the total number of messages in a queue. All the message selector needs to know at the point of selecting the first message, is the identifier of the second message. When the order is not a round robin scenario, each message may not include the selector information, and the message selector may select each message in a predetermined order (e.g., an order in which the messages are arrived at the queue).

Initially, a plurality of messages that are to be processed in a specific order are transmitted from a first computer for storage until retrieved by a second computer. Each message includes selector information provided by the first computer which identifies the sequence of processing. The sequence of processing can be in the order that they were transmitted or in a totally different order. The selector information can be anywhere in the message.

Upon receiving a request from a second computer to retrieve messages in the queue, a message selector such as an Application Program Interface (API) specifies the selector information that has been placed in the first document by the first computer. The message selector searches the queue for the first message by looking for the selector information. Upon locating the selected information and retrieving and processing the first message, the selector information in the first message dynamically updates the message selector component with new selector information which identifies a second message that is to be retrieved and processed. Thus, this invention extends the concept of a message selector by providing a message selector that can be dynamically updated by each message that it consumes to process a plurality of messages in any sequence order. Each message in the sequence carries an update for the message selector that identifies the next message in the sequence up to the last message. All the messages do not need to include the selector information to define an order of processing of the messages. A single first selector information (i.e., selector information accompanied with the first message) may be enough to define a complete sequence of processing of the messages.

Figure 3:
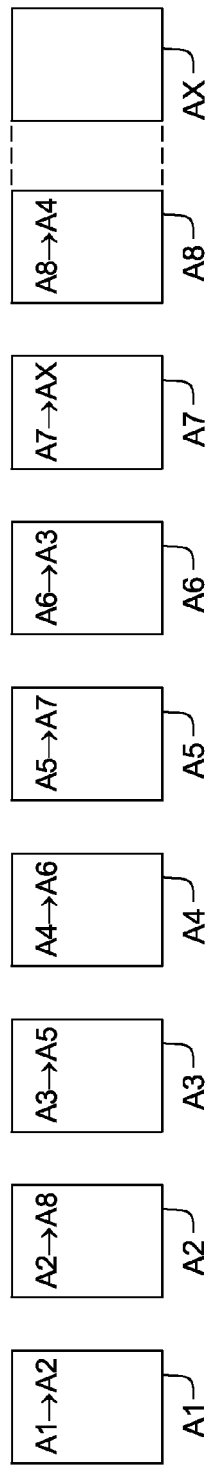
FIG. 3 is a pictorial representation of the messaging and queuing environment depicting the placement of messages place in a dynamic priority queue by a sending computer.

Referring to FIG. 3, there is shown a queue having nine messages A1 through A8 to Ax that were transmitted by a sending computer in numerical order of A1 through A8 to Ax, but are to be processed by a receiving computer in a new order that has been defined by the sending computer to be in the order of, A1, A2, A8, A4, A6, A3, A5, A7 and AX. Each message A1-AX includes selector information that defines which message is to be processed next. This selector information is inserted into the contents of the message by the sending computer prior to the message being sent. Once the message has been sent, the selector information cannot be changed.

Referring to FIG. 3, message A1 includes selector information "A1 go to A2". Each succeeding message contains selector information as follows:

In message A2: "A2 go to A8";
In message A3: "A3 go to A5";
In message A4: "A4 go to A6";
In message A5: "A5 go to A7";
In message A6: "A6 go to A3";
In message A7: "A7 go to Ax";
In message A8: "A8 go to A4"; and
In message Ax: "Ax go to stop".

Figure 4:
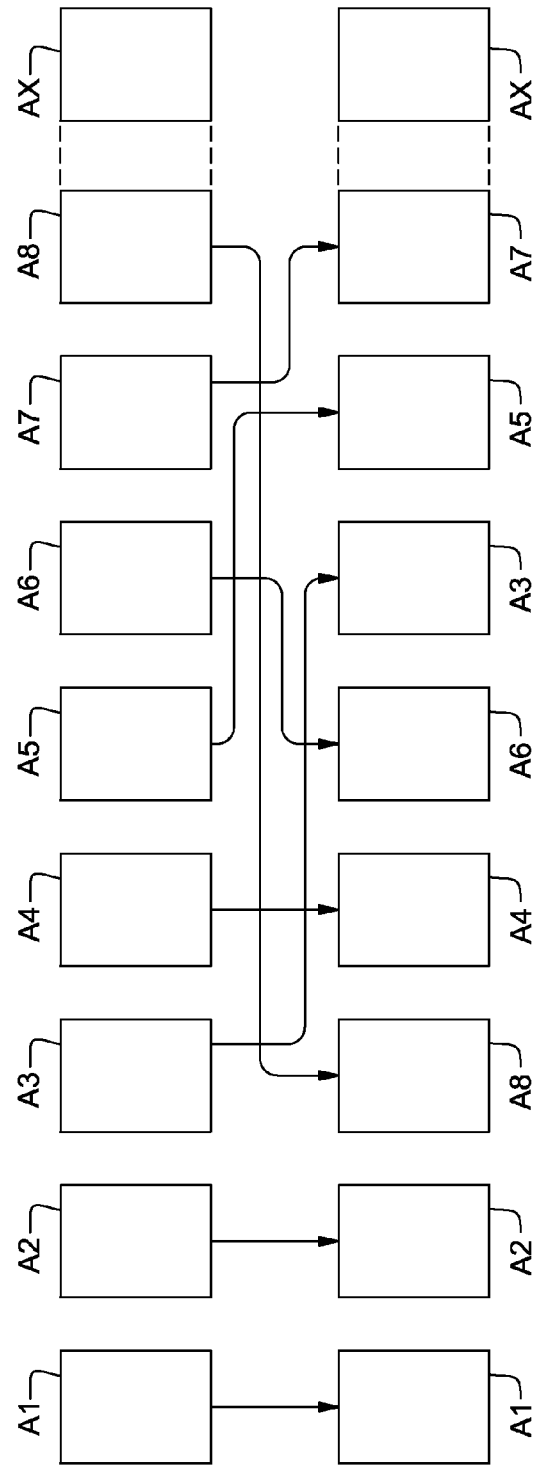
FIG. 4 is a pictorial representation of the messaging and queuing environment depicting the manner in which messages are place in the dynamic priority queue by a receiving computer.

To retrieve the messages that were transmitted in chronological order in the queue by the sending computer, the message selector in the receiving computer is instructed to look for selector information A1. The message selector only knows that it is to retrieve and process message A1. It does not know the order of the messages that are to be retrieved or the number of messages that are to be retrieved. Upon retrieving and processing the first message A1, message selector reads "A1 go to A2", the selector information in the message on the first message A1, and message selector is updated to search for message A2. Referring to FIG. 4, message A1 is the first message that is processed and the first message in the queue. Upon processing message A1, message selector is immediately updated to search for message A2 as the next message that is to be retrieved and processed as the second message in the queue. Immediately after processing message A1, message selector searches for message A2. Upon finding and processing message A2, message selector reads selector information "A2 go to A8" in message A2 and is updated to now search for message A8 as a third message in the queue. At this time, message A2 is processed and is the second message in the queue as instructed by the sending computer, and a search is made for message A8. Upon finding and processing message A8, message selector reads selector information "A8 go to A4" in message A8 and is updated to now search for message A4 which will be the fourth message in the queue. At this time message A8, not message A3, is the third message in the queue as instructed by the sending computer, and a search is made for message A4. See FIG. 4.

Immediately upon finding and processing message A4, message selector reads selector information "A4 go to A6" in message A4 and is updated to now search for message A6 as the fifth document in the queue. At this time message A4 is the fourth message processed as instructed by the sending computer, and a search is made for message A6. See FIG. 4.

This process searching, finding and processing message continues until the last message AX is located and processed as the last message in the queue. The selector information in the message on message AX instructs the message selector component to stop the search, and the process of assembling the message in the order assigned by the sending computed is ended. For example, as illustrated in FIG. 4, the receiving computer might receive the messages in an order of message A1, message A2, message A3, message A4, message A5, message A6, message A7, message A8 and message AX. However, the receiving computer may process the messages in an order of message A1, message A2, message A8, message A4, message A6, message A3, message A5, message A7 and message AX based on the selector information in each message.

With this invention, current restrictions imposed on messaging systems where message ordering is a requirement no longer applies. The method and system disclosed allows message ordering without having concerns about the order in which messages actually arrive.

As is disclosed, the message selector is dynamically updated by each message it consumes. Thus, messages can be processed in any sequence order because each message in the sequence carries an update for the message selector that identifies the next message in the sequence. The user need only select a first selector information for the complete sequence of messages. The selector information in each message in the queue select all of the remaining messages in the queue.

In operation, a user only designates a first selector information. Then, as each message is selected and processed, the message selector reads the selector information in the message for the next message in the sequence and updates itself to search for the next message ordered by the selector information. The first selector information is selected without knowing anything about the sequence or the number of message in the queue.

The method and system disclosed is not limited to selecting messages from a single queue or assembling messages in a single queue. With this invention, messages can be retrieved from multiple queues for assembling messages in either a single queue or in multiple queues. In the alternative, messages can be retrieved from a single queue and assembles into multiple queues.

Although the invention has been described with reference to specific embodiments, this description is not to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of queuing messages for communications between a first computer program and a second computer program, comprising the steps of:
    placing a plurality of messages in a queue, wherein each message has a message body;
    placing selector information on each message, a first message having first selector information, said first selector information defining a complete order of processing of messages, a subsequent message having selector information different from said first selector information, said different selector information defining a different complete order of processing messages; and
    using said different selector information on said subsequent message to identify a next message for processing,
    wherein a processor device performs executing one or more of: said placing a plurality of messages, said placing selector information and said using.

2. The method of claim 1 further comprising:
    placing selector information in each message prior to sending said plurality of messages from said queue.

3. The method of claim 1 wherein said placed selector information can appear on any part of each of said plurality of messages.

4. The method of claim 1, wherein said different selector information is an arbitrary function.

5. The method of claim 4 wherein said different selector information can not be changed after said subsequent message is sent from said queue.

6. The method of claim 1 wherein said plurality of messages each contain selector information that designates an order for processing said plurality of messages that is different than the order that said messages are in said queue.

7. The method of claim 1 wherein said plurality of messages each contain selector information that designates an order for processing said plurality of messages that is the same as the order that said messages are in said queue.

8. The method of claim 1 further comprising:
    using a message selector for identifying a next message to be processed from selector information on an immediately prior message already processed.

9. The method of claim 8 wherein selector information in the prior message is used by said message selector to identify the next message.

10. The method according to claim 1, wherein said plurality of messages are produced by multiple producers.

11. A computer program product for use with a computer, the computer program product including a non-transitory computer readable medium having recorded thereon a computer program or program code for causing the computer to perform a method for storing and retrieving data, the method comprising:
    placing a plurality of messages in a queue, wherein each message has a message body;
    placing selector information on each message, a first message having first selector information, said first selector information defining a complete order of processing of messages, a subsequent message having selector information different from said first selector information, said different selector information defining a different complete order of processing messages; and
    using said different selector information on said subsequent message to identify a next message for processing.

12. The computer program product of claim 11 further comprising:
    placing selector information in each message prior to sending said plurality of messages from said queue.

13. The computer program product of claim 11 wherein said placed selector information can appear on any part of each of said plurality of messages.

14. The computer program product of claim 12 wherein said different selector information is an arbitrary function.

15. The computer program product of claim 14 wherein said different selector information can not be changed after said subsequent message is sent from said queue.

16. The computer program product of claim 11 wherein said plurality of messages each contain selector information that designates an order for processing said plurality of messages that is different than the order that said messages are in said first queue.

17. The computer program product of claim 11 wherein said plurality of messages each contain selector information that designates an order for processing said plurality of messages that is the same as the order that said messages are in said first queue.

18. The computer program product of claim 11 further comprising:
   using a message selector for identifying a next message to be processed from selector information on an immediately prior message already processed.

19. The computer program product of claim 18 wherein selector information in the prior message is used by said message selector to identify the next message.

20. A system of queuing messages for communications between a first computer program and a second computer program, the system comprising:
   a memory device;
   a processor coupled to the memory device, wherein the processor is configured to perform steps of:
   placing a plurality of messages in a queue, wherein each message has a message body;
   placing selector information on each message, a first message having first selector information, said first selector information defining a complete order of processing of messages, a subsequent message having selector information different from said first selector information, said different selector information defining a different complete order of processing messages; and
   using said different selector information on said subsequent message to identify a next message for processing.

* * * * *